United States Patent
Toyama et al.

(10) Patent No.: US 7,921,229 B2
(45) Date of Patent: Apr. 5, 2011

(54) HOST DEVICE, STORAGE DEVICE, AND METHOD FOR ACCESSING A STORAGE DEVICE

(75) Inventors: Masayuki Toyama, Osaka (JP); Takuji Maeda, Osaka (JP); Tomoaki Izumi, Osaka (JP); Shouichi Tsujita, Kyoto (JP); Masahiro Nakanishi, Kyoto (JP); Shinji Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 547 days.

(21) Appl. No.: 11/571,597

(22) PCT Filed: Jun. 28, 2005

(86) PCT No.: PCT/JP2005/011800
§ 371 (c)(1),
(2), (4) Date: Mar. 20, 2007

(87) PCT Pub. No.: WO2006/006388
PCT Pub. Date: Jan. 19, 2006

(65) Prior Publication Data
US 2008/0046606 A1    Feb. 21, 2008

(30) Foreign Application Priority Data
Jul. 8, 2004    (JP) ................................ 2004-201509

(51) Int. Cl.
*G06F 3/00*    (2006.01)
*G06F 13/12*    (2006.01)

(52) U.S. Cl. ................ 710/5; 710/11; 710/65; 709/209; 709/236; 709/237; 717/168; 717/169; 717/173; 726/11; 726/17; 726/21

(58) Field of Classification Search ................ None
See application file for complete search history.

(56) References Cited

U.S. PATENT DOCUMENTS

| | | | |
|---|---|---|---|
| 5,408,082 A | 4/1995 | Takagi et al. | |
| 5,678,029 A * | 10/1997 | Iijima | ............................. 710/65 |
| 6,279,114 B1 | 8/2001 | Toombs et al. | |
| 6,574,294 B1 * | 6/2003 | Lynch et al. | .................. 375/354 |
| 6,609,167 B1 | 8/2003 | Bastiani et al. | |
| 7,159,075 B2 | 1/2007 | Moro | |

(Continued)

FOREIGN PATENT DOCUMENTS

JP    2-28741    1/1990

(Continued)

OTHER PUBLICATIONS

U.S. Appl. No. 11/571,592 to Toyama et al., filed Jan. 3, 2007.

(Continued)

*Primary Examiner* — Eron J Sorrell
*Assistant Examiner* — Dean Phan
(74) *Attorney, Agent, or Firm* — Greenblum & Bernstein, P.L.C.

(57) ABSTRACT

A host device (1) adds host function information indicating a function of the host device (1) to a command and transmits it to a storage device (2). The storage device (2) receives the command transmitted from the host device (1) and determines whether the function indicated by the host function information can be processed. When the function can be processed, the function is processed based on the command. When the function cannot be processed, no response is returned or error information is returned. Thus, under simple control, it is possible to prevent data destruction by a host device of an old version.

20 Claims, 6 Drawing Sheets

U.S. PATENT DOCUMENTS

| | | |
|---|---|---|
| 2001/0032277 A1 | 10/2001 | Igarashi et al. |
| 2002/0191612 A1* | 12/2002 | Curtis ........................... 370/392 |
| 2003/0090953 A1 | 5/2003 | Kawai et al. |
| 2004/0107316 A1 | 6/2004 | Moro |
| 2004/0136533 A1* | 7/2004 | Takagaki et al. .............. 380/255 |
| 2005/0021885 A1* | 1/2005 | Anderson et al. ................ 710/29 |
| 2005/0053091 A1* | 3/2005 | Lee ............................... 370/466 |
| 2006/0097061 A1 | 5/2006 | Moro |

FOREIGN PATENT DOCUMENTS

| | | |
|---|---|---|
| JP | 6-60235 | 3/1994 |
| JP | 2001-249802 | 9/2001 |
| JP | 2003-223623 | 8/2003 |
| JP | 2004-086505 | 3/2004 |

OTHER PUBLICATIONS

English language Abstract of JP 02-028741.

English language Abstract of JP 06-060235.

English language Abstract of JP 2003-223623.

English language Abstract of JP 2004-086505.

English language Abstract of JP 2001-249802.

SanDisk: "SanDisk Secure Digital Card Product Manual Version 1.9 Document No. 80-13-00169", Internet Citation, Dec. 1, 2003, pp. I-E2, XP007907830, Retrieved from the Internet: URL:http://www.cs.ucr.edu/{amitra/sdcard/ProdManualSDCardv1. 9. pdf>.

* cited by examiner

| S | COM | Host device information | For extention | Check pattern | CRC | E |
|---|---|---|---|---|---|---|
| | | F1 | F2 | F3 | | |

(b)

| S | COM | Storage device information | All 0 | Check pattern | CRC | E |
|---|---|---|---|---|---|---|
| | | F1 | F2 | F3 | | |

HOST DEVICE, STORAGE DEVICE, AND METHOD FOR ACCESSING A STORAGE DEVICE

TECHNICAL FIELD

The present invention relates to a host device, storage device, and method for accessing a storage device that execute the initialization of the storage device and data transmission and reception with use of a command, wherein the storage device is connected to the host device by using a bus.

BACKGROUND ART

In devices (referred to as host devices below) that control digital data such as a digital camera, movie, and portable music player, there is a memory card, as a storage device for retaining digital information, mounting a non-volatile memory. In order to realize compatibility between memory cards and host devices manufactured by a plurality of manufacturers, a scheme for a host devise to access a memory card is standardized. A version of the standard is upgraded along with enlargement of capacity and addition of functions of a memory card. A method for making a host device to execute access by showing different storage capacities to each host device with use of multiple ways of capacity reference is proposed (for example, see Patent document 1).

Patent document 1: Unexamined Patent Publication 2004-86505.

DISCLOSURE OF INVENTION

Problems to be Solved by the Invention

However, the conventional technique described above has following problems. That is to say, there is such a problem that a host device of an old version may destroy data written by a host device of a new version because host devices which are in different version can access the same storage area. Also, there is such a problem that internal configuration and control of a memory card becomes complex since multiple areas are provided in a memory card and access control based on a host device is executed.

In view of the above mentioned problem, the present invention is designed to provide a host device, storage device, and method for accessing a storage device that can prevent data destruction by a host device of an old version with simple control in the host device and storage device.

Means to Solve the Problems

To solve the problem, a host device of the present invention is a host device which is connected to a storage device via a bus and reads and writes data in the storage device comprising: a command transmission unit for transmitting a command including host function information to the storage device; a response reception unit for accepting a response from the storage device after transmission of a command from the command transmission unit; and an acceptable/unacceptable access determination unit for determining that access is acceptable when normal reception from the response reception unit is identified after transmission of each command from the command transmission unit and otherwise determining that access is unacceptable.

To solve the problem, a storage device of the present invention is a storage device which is connected to a host device via a bus and stores and reads data based on a commands from the host device comprising: a memory for retaining data given from the host device; a memory control unit for controlling data-reading and data-writing to the memory; a command reception unit for receiving a command issued from the host device and executing processing in accordance with each command; an access determination unit for accepting access when a function indicated by the host function information added to a command received by the command reception unit is supported; and a response transmission unit for returning a normal response when the access determination unit determines acceptance of access.

To solve the problem, a method for accessing a storage device of the present invention is a method for accessing a storage device by a host device which is connected to the storage device via a bus and reads and writes data in the storage device comprising: transmitting a command including host function information to the storage device; accepting a response from the storage device after transmission of a command; determining that access is possible when a response received after command transmission is determined as a normal response, and otherwise determining that access is impossible.

Effectiveness of the Invention

As described above, in the present invention, since a host device cannot access a storage device whose version of the standard is different from that of the host device, data destruction can be prevented. In addition, a host device and storage device can be realized in a simple configuration since it is possible to determine availability of access only in transmission and reception processing of a command. A host device, storage device, and method for accessing a storage device that prevent data destruction by a host device of an old version can be provided with simple control.

DESCRIPTION OF REFERENCE NUMERALS

1 Host device
101 CPU
102 ROM
103 RAM
104 Interface
101a Command transmission unit
101b Response reception unit
101c Access determination unit
2 Storage device
201 Interface
202 Control unit
203 Memory control unit 204 Memory
202a Command reception unit
202b Response transmission unit
202c Access determination unit
3 Bus

BEST MODE FOR CARRYING OUT THE
INVENTION

Figure 1:
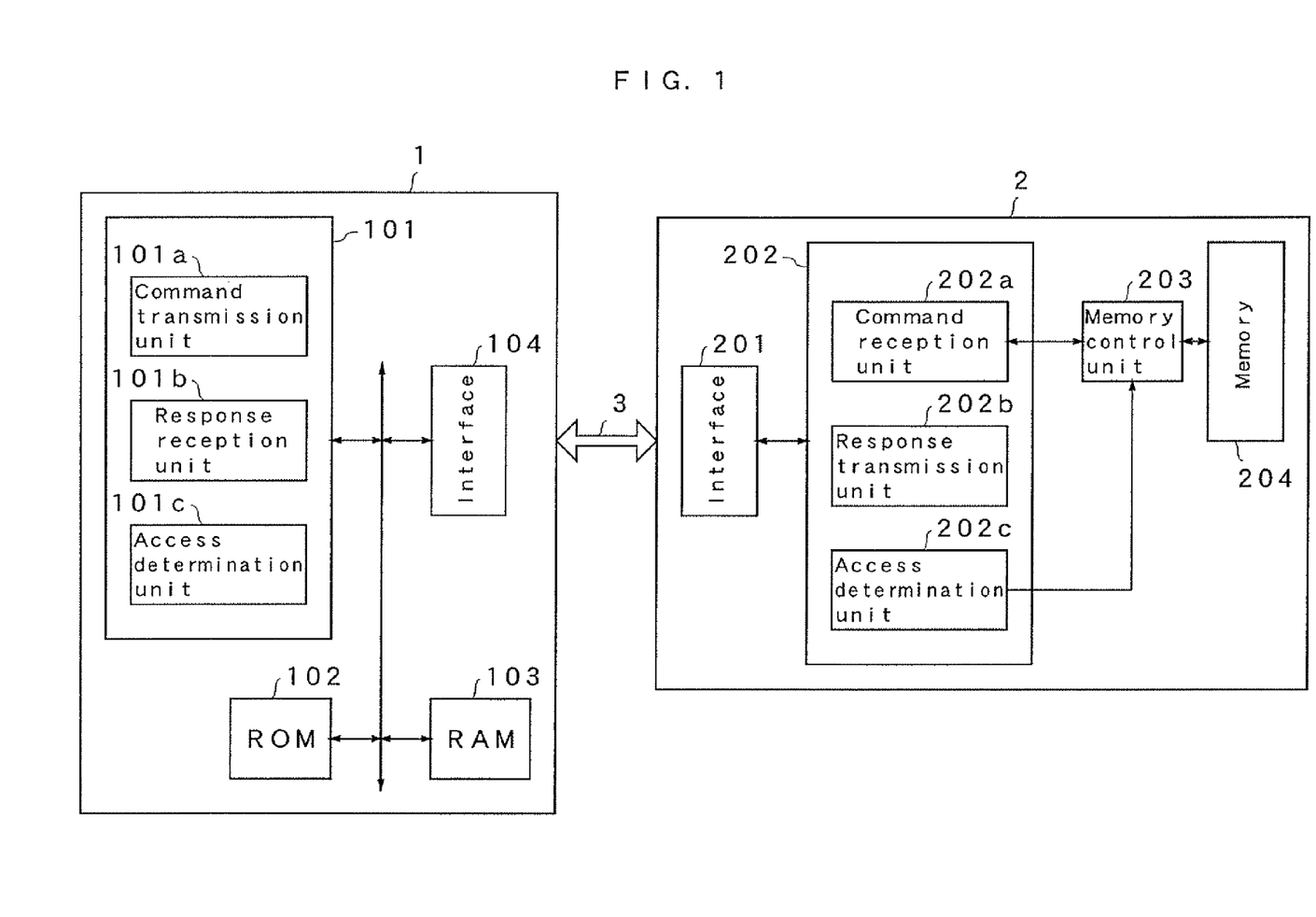
FIG. 1 is a block diagram showing configuration of a host device and storage device according to an embodiment of the present invention.

FIG. 1 is a block diagram showing configuration of a storage system according to an embodiment of the present invention. As shown in FIG. 1, the storage system according to the embodiment of the present invention includes a host device 1 and storage device 2 and connects the storage device 2 to the host device 1 with use of a bus 3. The host device 1 includes a CPU 101, ROM 102 for storing a program for the CPU 101, RAM 103 for a work area of the CPU, and interface 104. The interface 104 transmits a command, data, and addresses to the storage device 2 and receives a response. The ROM 102 stores an access program that is executed by the CPU 101. In addition, the CPU 101 achieves functions of a command transmission unit 101a, response reception unit 101b, and access determination unit 101c. The command transmission unit 101a transmits a command containing host function information via the interface 104. The host function information shows a function that is executed by the host device 1. The response reception unit 101b accepts a response from the command transmission unit after command transmission, and determines existence or nonexistence of an error. The access determination unit 101c determines availability of access after transmission of each command. That is to say, when the normal response from the response reception unit 101b is identified, the access determination unit determines as acceptable and otherwise determines as unacceptable.

The storage device 2 includes an interface 201, control unit 202, memory control unit 203, and memory 204. The interface 201 receives a command and data from the host device 1 and transmits a response. In addition, the control unit 202 includes a command reception unit 202a, response transmission unit 202b, and access determination unit 202c. The command reception unit 202a receives a command issued from the host device and executes processing based on each command. The access determination unit 202c determines whether a function included in a command received by the command reception unit is supported or not, and when it is supported, processing to accept access is executed. The reception transmission unit 202b responds based on a determination result of the access determination unit 202c. The memory control unit 203 controls reading and writing of data from and to the memory 204 and the memory 204 retains data given from the host device. The storage device 2 determines access from the host device 1 as acceptable when the storage device supports a function included in a command transmitted from the host device 1.

Figure 2:
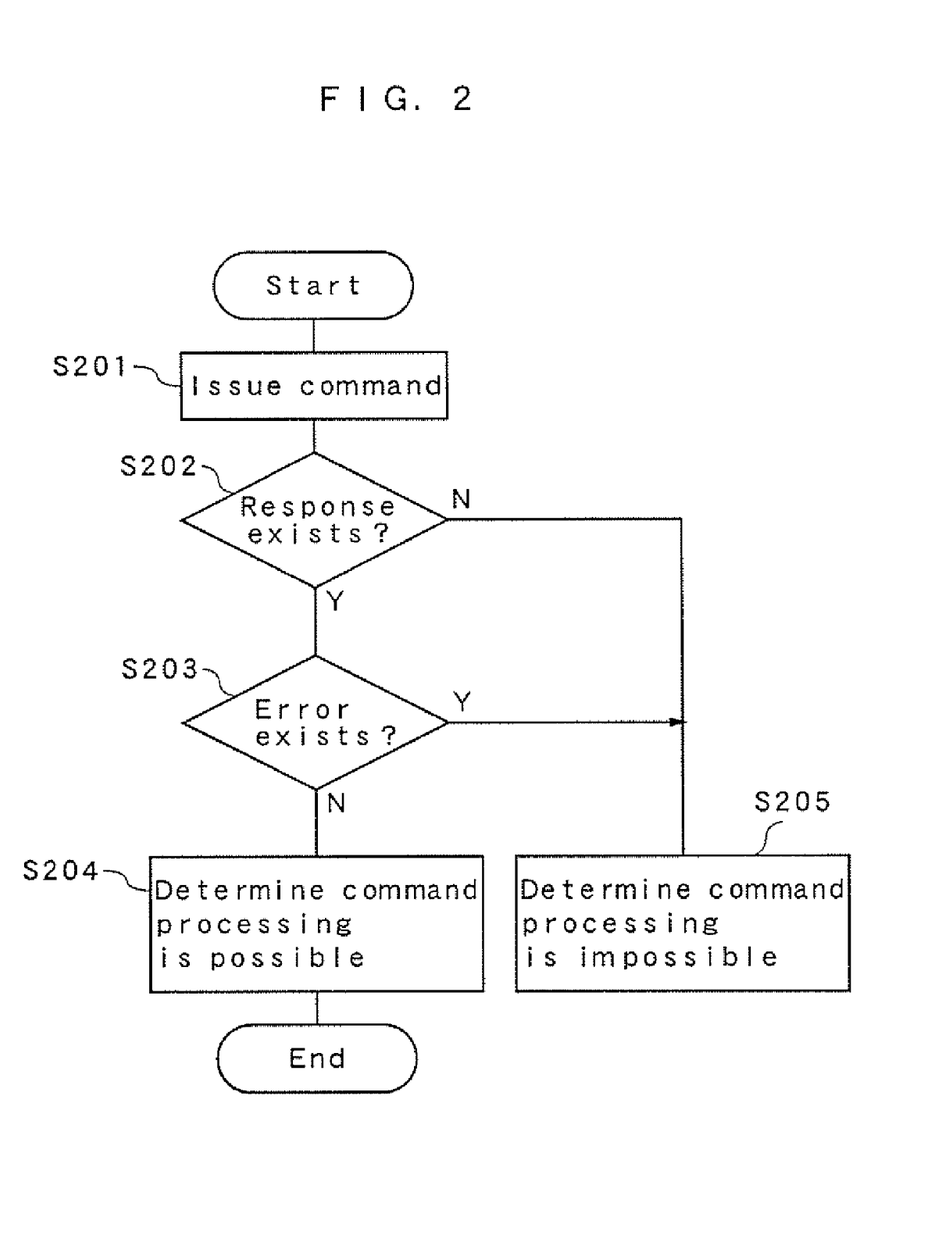
FIG. 2 is a flowchart showing a method for the host device to access the storage device.

FIG. 2 is a flowchart of command transmission processing executed by the host device 1. The host device 1 transmits a command including host function information to the storage device 2 as described below (S201), and waits for a response from the storage device 2 (S202). When the storage device 2 responds, the host device checks content of the response and confirms if an error exists (S203). If no error exists, it is determined that access to the storage device 2 is acceptable. If necessary, data is transmitted and received. On the other hand, if the storage device 2 does not respond at S202 or if an error is included in the response at S203, it is determined that access to the storage device 2 is unacceptable.

Host function information showing a function provided by the host device 1 is added to a command to be transmitted. The host function information, for example, may be a version number of a standard that the host device 1 meets, and may be an unique bit pattern or flag showing that a predetermined function is provided. For instance, the host function information includes a kind of a file system such as FAT16, FAT32, or UDF, or an addressing mode, and further includes, as an additional function, existence or nonexistence of a cache function, existence or nonexistence of an interruption function, or supporting or non-supporting a high-speed interface.

Figure 3:
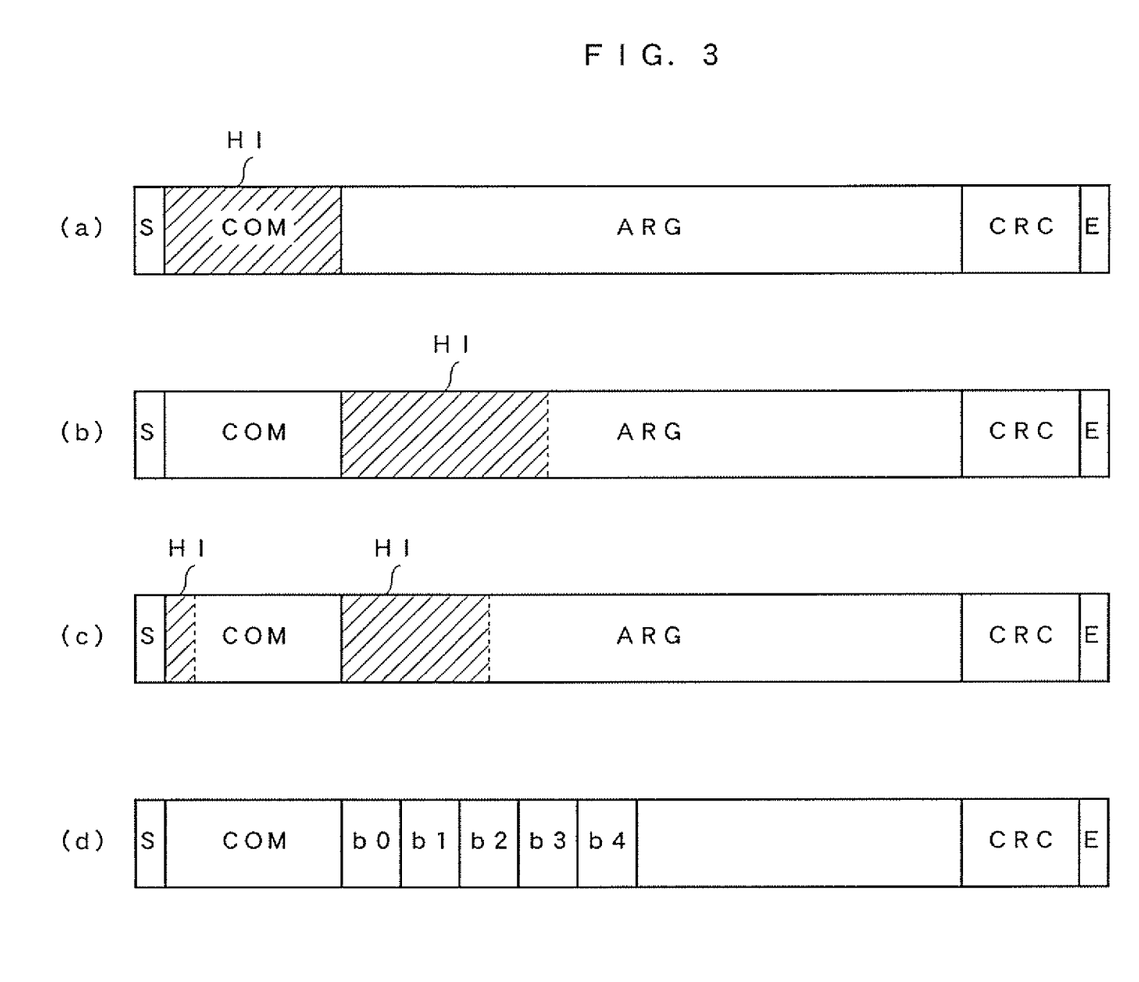
FIG. 3 is a view showing a command format issued by the host device.

FIG. 3 is an example of a command format transmitted by the host device 1. A command consists of a start flag S, command identifier COM, command argument ARG, CRC (Cyclic Redundancy Code) for detecting an error included in the COM and ARG, and end flag E. The host function information HI is added by using all or a part of the identifier COM as shown in FIG. 3(a) with the hatching, by using all or a part of the argument ARG as shown in FIG. 3(b) with the hatching, or by using both of the identifier COM and argument ARG as shown in FIG. 3(c). FIG. 3(d) shows an example of a command for informing a storage device of the host function information HI with use of a plurality of bits of the argument ARG. For example, b0 and b1 show a file system, b2 shows existence or nonexistence of interruption function, b3 shows a function of cache, and b4 shows existence or nonexistence of a high-speed interface. In addition, if it is assumed that a host device meeting a standard of a new version adds the host function information HI to a command, the fact that the host function information is not added to a command enables identifying a host device meeting a standard of an old version. And, as described below, when the storage device 2 adds storage device information showing a function that is provided by the storage device 2 to a response to a command, the host device 1 can select a kind and/or format of a command to be transmitted based on the storage device information.

Figure 4:
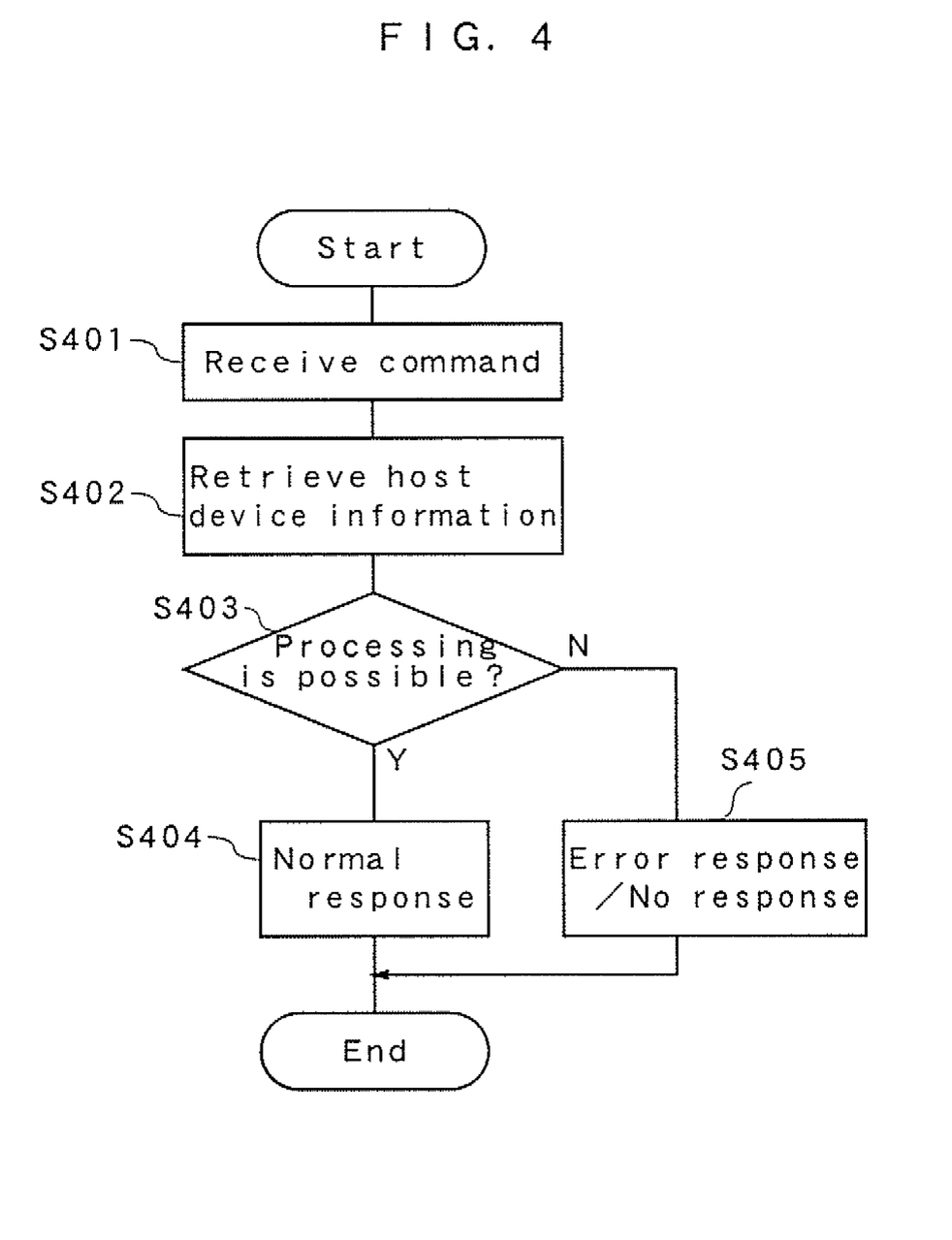
FIG. 4 is a flowchart showing a method for the storage device to process a command.

When receiving a command from the host device 1, the storage device 2 determines whether the storage device can execute the function shown in the host function information included in the command. FIG. 4 is a flowchart of command reception processing by the storage device 2. When receiving a command transmitted by the host device 1 (S401), the storage device 2 executes the command and retrieves host function information added in the command identifier or argument, or in both of them (S402). And, it is determined whether the storage device can execute the function indicated by the host function information (S403). When being able to execute the function shown in the command, the storage device returns a normal response to the host device (S404). In the embodiment, a normal response is returned only when all of the shown functions are supported. On the contrary, when it is determined that at least some of the functions cannot be executed, a response including error information is returned (S405). In addition, in stead of the response, a time-out may be occurred without returning a response.

In the embodiment described above, a normal response is returned only when all of the shown functions are supported, but, even when only some of the functions are supported, the storage device may return a normal response and may add storage device information showing a function that is provided by the storage device to a response. The storage device information, for example, may be a version number of a standard that the storage device 2 meets, or may be an unique bit pattern or flag showing that a predetermined function is provided.

Figure 5:
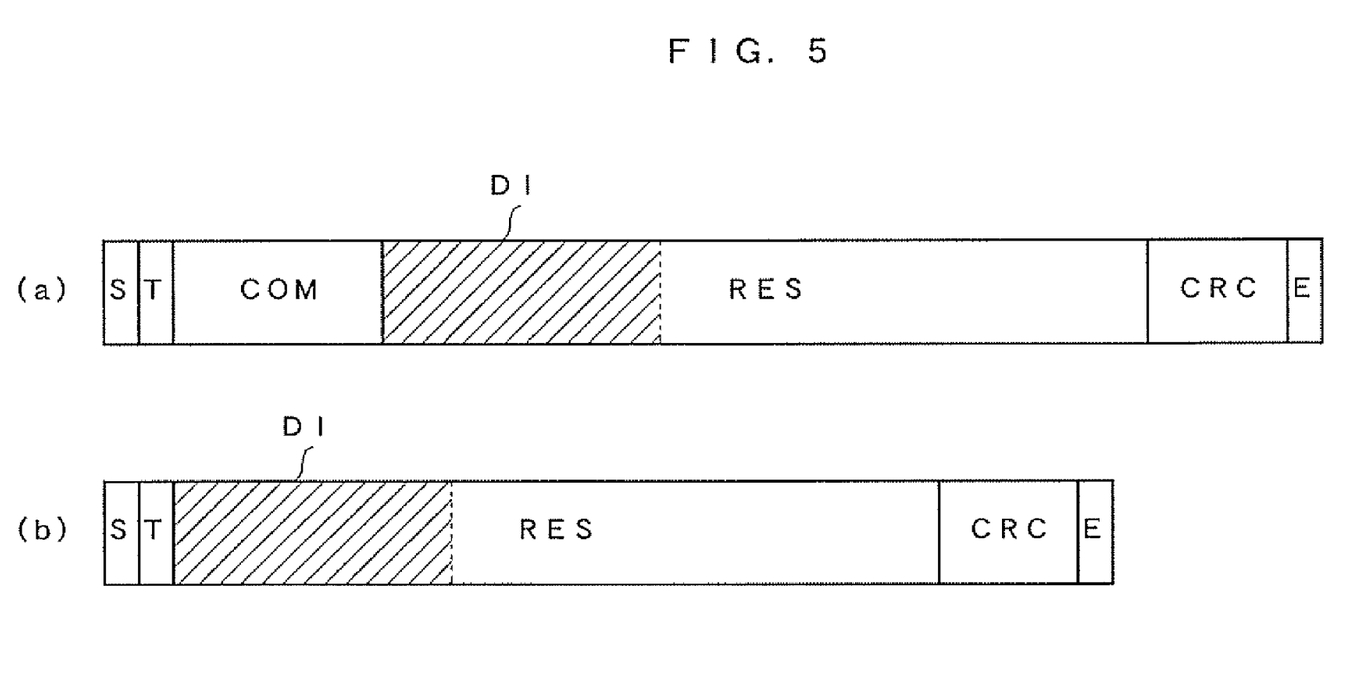
FIG. 5 is a view showing a format of a command response of the storage device.

FIG. 5 is a format of the case where the storage device 2 responds by adding the storage device information to a command of the host device 1. Concerning a response, FIG. 5 shows an example of a format of the response consisting of a start flag S, transmission flag T, identifier COM of a command transmitted by the host device 1, response RES, CRC for detecting an error included in the COM and RES, and end flag E. An example of including a storage device information DI in a part of the response RES is shown with use of hatching here. In addition, as shown in FIG. 5(*b*), the format may consist without the identifier COM transmitted by the host device 1. Error information for indicating whether the host device can process the transmitted command may be added to the response RES. In addition, the response RES may consist without the storage device information. In addition, a storage device which meets a standard of a new version adds the storage device information DI to a command, and, as a result, a storage device which meets a standard of an old version can be identified when the storage device information is not added to a response to the command.

Figure 6:
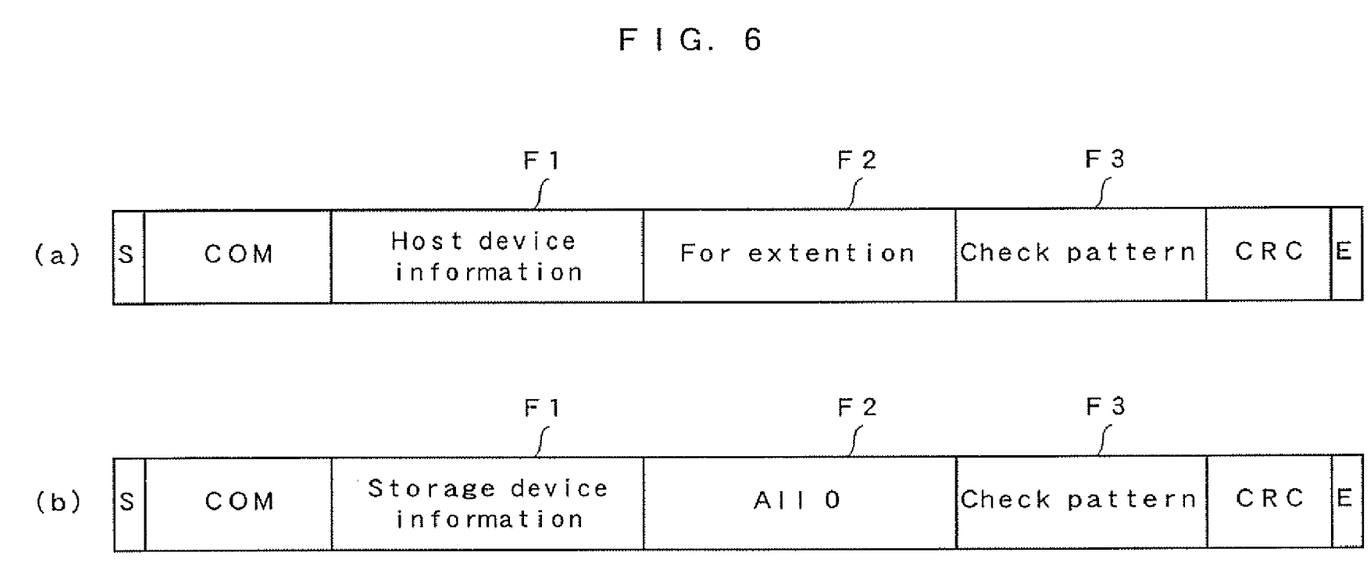
FIG. 6 is a view showing another example of a command transmitted by the host device and another example of a response from the storage device.

FIG. 6(*a*) is a view showing another example of a command issued by the host device 1 and FIG. 6(*b*) is a view showing an example of a response to the command on the storage device. In the example, a command and response to it are in the same format. In addition to the command identifier (command number), an argument area is divided into three fields of F1, F2, and F3. The first field F1 is a field for showing host function information which includes a function of the host device, for example, information of a file system, a function of interruption, addressing mode or etc. in a similar way described above. In the case, it is considerable to set a bit corresponding to the file system, interruption function, or support function such as the addressing mode. The second field F2 is a field for extension, that is, a field for a future addition of an extended function. The third field F3 is a field in which a check pattern to check communication quality is inserted.

In addition, as shown in FIG. 6(*b*), a response of the storage device is constructed with use of a format same as this. In the case, the first field F1 corresponding to the host function information is a field for showing storage device information, data corresponding to the host function information are checked, a function is returned as the storage device information. When a bit indicating a function supported by the host function information in a command from the host device is set, in a response of the storage device, it can be considered that the storage device sets the same bit when the function is supported in the response and sets 0(zero) when it is not supported. In addition, since the second field F2 is a field retained for extension, "1(one)" or "0(zero)" is returned from the storage device about all in the field. And furthermore, the third field F3 is a field for confirming communication quality. In the response, the storage device may return a check pattern issued from the host device 1 as it is, or reverse of the check pattern or exclusive OR (EXOR) of appropriate output to the host device side.

When the formats shown in FIGS. 6(*a*) and (*b*) are used, the response reception unit 101*b* shown in FIG. 1 is required not only to read the storage device information retained in the first field F1 but also to include a function for determining whether a check pattern is the same as the transmitted check pattern or whether a check pattern is identical with a result of necessary processing. And, the response transmission unit 202*b* is required to include processing that transmits a check pattern received from the host device 1 as it is or that converts the check pattern into a check pattern to be returned to the third field through a predetermined operation. Thus, not only the host function information can be transmitted to the storage device side, but also future extension is possible and communication quality can be recognized by the storage device and host device sides.

INDUSTRIAL APPLICABILITY

According to the present invention, a storage device determines a function included in a transmission command of a host device, and determines access of the host device as acceptable only when the storage device supports the function, and thereby access control can be executed by a simple configuration and under simple control and it is useful for the host device, storage device, and method for accessing a storage device that execute initialization of the storage device and data transmission and reception by using a command.

The invention claimed is:

1. A host device which is connected to a storage device via a bus and reads and writes data in the storage device, the storage device including a command reception unit that receives, from the host device, a command that includes host function information, indicating at least one function of said host device, and a response transmission unit that transmits a normal response to the host device only when the storage device supports all of the at least one function indicated by the host function information included in the command, the host device comprising:
a command transmission unit that transmits the command including the host function information to the storage device, the host function information indicating the at least one function of the host device;
a response reception unit that accepts a response from the storage device after transmission of the command from said command transmission unit; and
an acceptable/unacceptable access determination unit that determines that access to the storage device is acceptable when the normal reception is identified by said response reception unit after transmission of the command from said command transmission unit and otherwise determines that access is unacceptable.

2. The host device according to claim 1, wherein the host function information is included in at least one of a command identifier and an argument of the command.

3. The host device according to claim 1, wherein a command transmitted from said command transmission unit includes and argument area having:
a first field that retains the host function information used by the host device;
a second field that is used as an area for extension; and
a third field that retains a check pattern for checking communication quality.

4. The host device according to claim 3, wherein the response received from the storage device includes a check pattern in a field, which is added in response to the check pattern in the command transmitted to the storage device, and
said response reception unit determines the communication quality based on the check pattern in the field of the response received from said the storage device.

5. A storage device which is connected to a host device via a bus and stores and reads data based on a command from said host device, the storage device comprising:
a memory that retains data received from the host device;
a memory control unit that controls data-reading and data-writing to said memory;
a command reception unit that receives a command issued from said host device and executes processing in accordance with the command, the command including host function information indicating at least one function of the host device;
an access determination unit that retrieves the host function information from the received command, and accepts access by the host device when all of the at least one function indicated by host function information in the command received by said command reception unit is supported by the storage device; and
a response transmission unit that returns a normal response only when said access determination unit determines acceptance of the access,
wherein a response from said response transmission unit includes:
a first field that retains storage device information showing a function provided by the storage device in response to the host function information in the command from the host device;
a second field in which all values are fixed values; and
a third field that includes a check pattern for checking communication quality.

6. The storage device according to claim 5, wherein said response transmission unit adds storage device information indicating a function provided by said storage device to the response to the command including the host function information.

7. The storage device according to claim 5, wherein said response transmission unit returns error information to the host device when one of that at least one function indicated by the host function information cannot be processed.

8. The storage device according to claim 5, wherein said response transmission unit responds to said host device only when all of the at least one function indicated by the host function information can be processed.

9. The storage device according to claim 5, wherein, when the command received from the host device includes a check pattern, said response transmission unit adds the same check pattern or an operated check pattern to the third field.

10. The storage device according to claim 5, wherein said storage device is a semiconductor memory card.

11. The storage device according to claim 5, wherein the command from the host device includes the host function information in at least one of a command identifier and an argument, and
the access determination unit retrieves the host function information from the at least one of the command identifier and the argument included in the command.

12. A storage system comprising a host device and a storage device, wherein
said host device is connected to said storage device via a bus and reads and writes data in said storage device and comprises:
a command transmission unit that transmits a command including host function information to said storage device, the host function information indicating at least one function of the host device;
a response reception unit that accepts a response from said storage device after transmission of the command from said command transmission unit; and
an acceptable/unacceptable access determination unit that determines that access to the storage device is acceptable when a normal reception is identified by said response reception unit after transmission of the command from said command transmission unit and otherwise determines that access is unacceptable,
wherein said storage device comprises:
a command reception unit that receives the command including the host function information from the host device, the host function information indicating the at least one function; and
a response transmission unit that transmits the normal response to the host device only when the storage device supports all of the at least one function indicated by the host function information included in the command.

13. The storage system according to claim 12, wherein the host function information is added in at least one of a command identifier and an argument of the command.

14. The storage system according to claim 12, wherein a command transmitted from said command transmission unit includes an argument area having:
a first field that retains the host function information used by the host device;
a second field that is used as an area for extension; and
a third field that retains a check pattern for checking communication quality.

15. The storage system according to claim 14, wherein
the response received from said storage device includes a check pattern in a field, which is added in response to the check pattern in the command transmitted to the storage device, and
said response reception unit of said host device determines the communication quality based on the check pattern in the field of the response received from said storage device.

16. The storage system according to claim 12, wherein
said response transmission unit of said storage device adds storage device information indicating a function provided by said storage device to the response to the command including the host function information.

17. The storage system according to claim 16, wherein
wherein the response from said response transmission unit includes:
a first field that retains the storage device information showing the function provided by said storage device in response to the host function information in the command from said host device;
a second field in which all values are fixed values; and
a third field that includes a check pattern for checking communication quality,
wherein, when the command received from the host device includes a check pattern, said response transmission unit adds the same check pattern or an operated check pattern to the third field.

18. The storage system according to claim 12, wherein
said response transmission unit of said storage device returns error information to said host device when one of the at least one function indicated by said host function information cannot be processed.

19. The storage system according to claim 12, wherein
said response transmission unit of the storage device responds to said host device only when all of the at least one function indicated by said host function information can be processed by said storage device.

20. The storage system according to claim 12, wherein said storage device is a semiconductor memory card.

* * * * *